Jan. 4, 1955     C. V. EDWARDS     2,698,563
AGRICULTURAL TOOL SUPPORTING AND OPERATING MEANS
Filed May 9, 1950     2 Sheets-Sheet 1

CURTIS V. EDWARDS,
INVENTOR.

BY
ATTORNEY

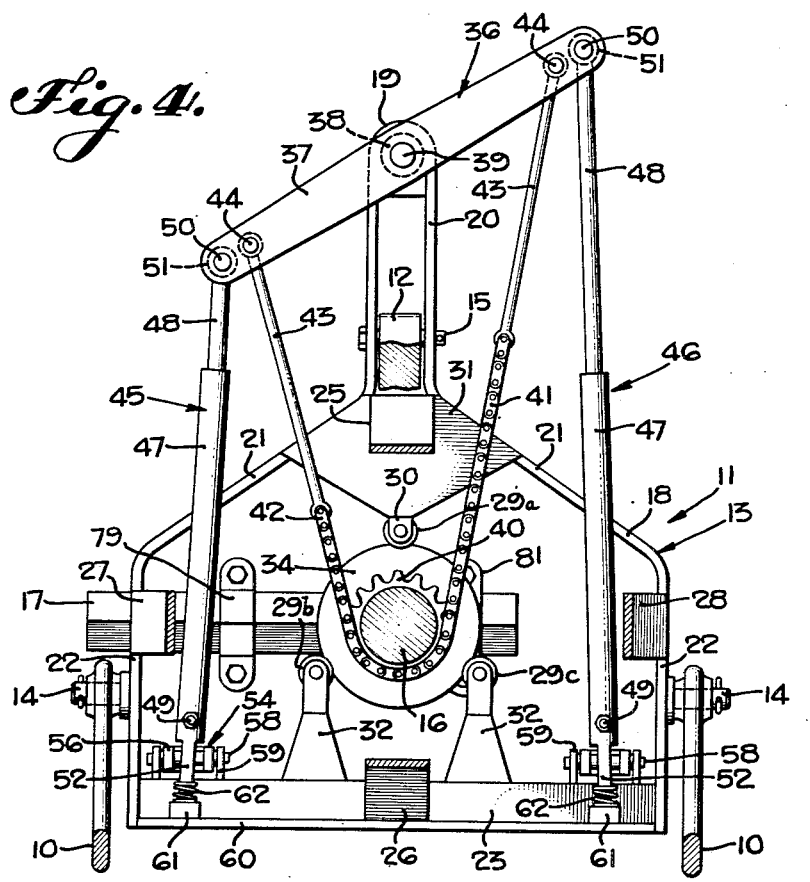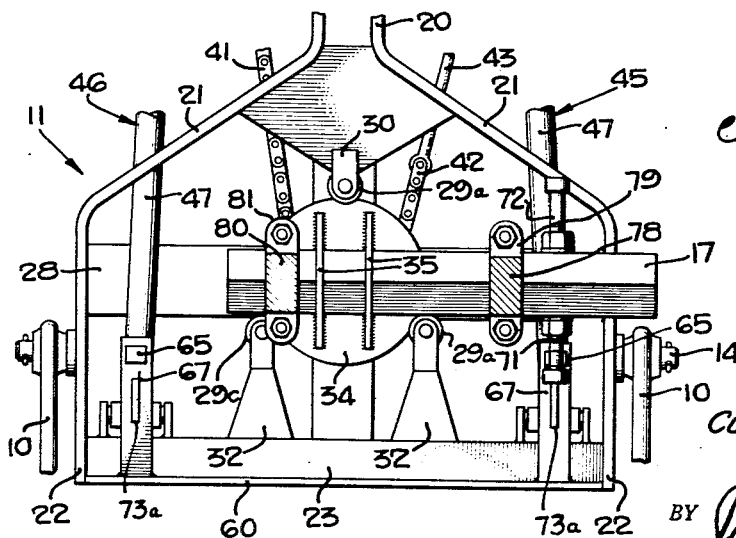

United States Patent Office 2,698,563
Patented Jan. 4, 1955

2,698,563

AGRICULTURAL TOOL SUPPORTING AND OPERATING MEANS

Curtis V. Edwards, Yakima, Wash., assignor to Edwards Equipment Company, Yakima, Wash., a corporation of Washington Application May 9, 1950, Serial No. 160,979

9 Claims. (Cl. 97—26)

My invention relates to a simple attachment for tractor vehicles for carrying and adjusting agricultural tools, and relates in particular to hydraulically operated attachment especially adapted for use with agricultural tools such as two-bottom plows arranged in righthand and lefthand pairs, the tool attachment has simple means for operating it so that it will bring one set and then the other set of plows into plowing position, thereby making it possible to plow back and forth across a field instead of in a circle. An understanding of the invention will show that it is adapted for supporting and adjusting other types of agricultural tools with relation to the ground.

The invention is especially adapted for use with tractors having hydraulically raised and lowered arms extending rearwardly therefrom to which arms agricultural tools are attached, the operation of the hydraulic mechanism associated with the arms accomplishing raising and lowering of the tools in accordance with the desires of the operator. An object of the invention is to provide a tool attachment of simple, rugged and inexpensive form having a tool support rotatable on an axis which extends longitudinally of the vehicle, this tool support being rotatable through such large angle that several sets of tools may be mounted thereon, the rotation of the support between the respective positions thereof bringing the different sets of tools into position for working the soil. An especial value of this tool supporting attachment is for the support of righthand and lefthand plows, either of single or multiple bottom. The device has simple means for rotating the tool support so as to bring either the lefthand or the righthand plow into ground engaging position.

It is an object of the invention to provide simple motor means, operated by fluid pressure differential to rotate the tool support between first and second positions and to provide a simple arrangement of automatically released latches for holding the tool support in said first and second positions thereof.

A further object of the invention is to provide in this device a simple linkage between cooperating parts whereby a relatively small angular movement of one part by the motor means will accomplish a larger angular movement of the tool support.

A further object of the invention is to provide a rocker member in this device arranged to be rocked between first and second positions by operating means actuated by fluid pressure differential, and a simple linkage between the rocker member and the tool support which will accomplish a 180° rotation of the tool support from a rotation of the rocker member of approximately 75°.

A further object of the invention is to provide a simple means for adjusting the tool bar extreme positions so that the depth of the tool penetration may be regulated when one wheel of the tractor is running in a previously cut furrow.

Further objects and advantages of the invention will be brought out in the following part of the specification wherein I have described a preferred embodiment of the invention in detail for the purpose of complete disclosure without limiting the scope of the invention as defined by the accompanying claims.

Referring to the drawings which are for illustrative purposes only:

Fig. 4 is a sectional view taken substantially as indicated by the line 4—4 of Fig. 2;

Fig. 5 is a fragmentary sectional view taken substantially as indicated by the line 5—5 of Fig. 2.

Figure 1:
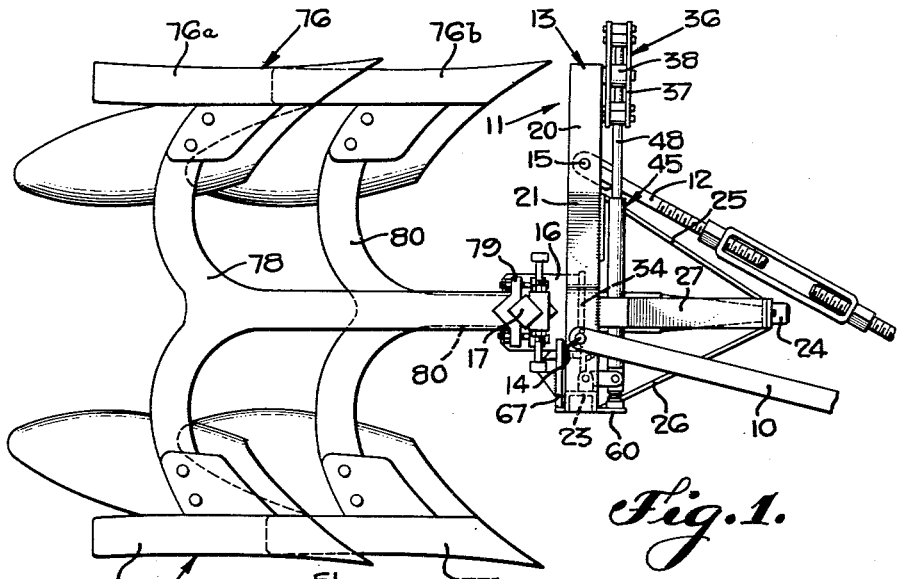
Fig. 1 is a side elevation of a preferred embodiment of my tool attachment, this view also showing the supporting arms which extend from the tractor.

In Figs. 1, 4 and 5, I show portions of arms 10 which extend from the rearward portion of a tractor, not shown. My tool attachment 11 is connected to the ends of the arms 10, and is further connected to the tractor by an adjustable link 12, Fig. 1, so that the upward and downward swinging of the arms 10 will result in a raising and lowering of the tool attachment 11.

The tool attachment 11 includes a frame 13 which is connected by pivot means 14 and 15 so as to provide a substantially vertically moving support, and a rotary tool support 16 which is carried by the frame 13, and has a transverse tool supporting bar 17 at the rearward (leftward in Fig. 1) end thereof.

The frame 13 has a main section 13' comprising a flat bar 18 bent as shown at 19 so as to provide vertically extending post sections 20, diverging legs 21 at the lower ends of the post sections 20, and, extending downwardly from the lower ends of the diverging legs 21, vertical side portions 22 of the frame on which the pivot means 14 may be mounted. A horizontal channel 23 has its ends connected to the lower extremities of the sides 22 of the frame 13 so as to provide a bottom for the frame 13. The pivot means 15 for the cuter ends of the link 12 extends across the post sections 20 of the frame 13.

An outboard bearing 24 is supported forwardly of the main section 13' of the frame 13 by diagonal arms 25, 26, 27 and 28. The arms 25 and 26 are disposed in a vertical plane and extend respectively from the lower end of the post section 20 and the bottom or channel 23 of the frame 13. The arms 27 and 28 extend forwardly in converging relation from the sides 22 of the main section 13' of the frame 13.

Figure 2:
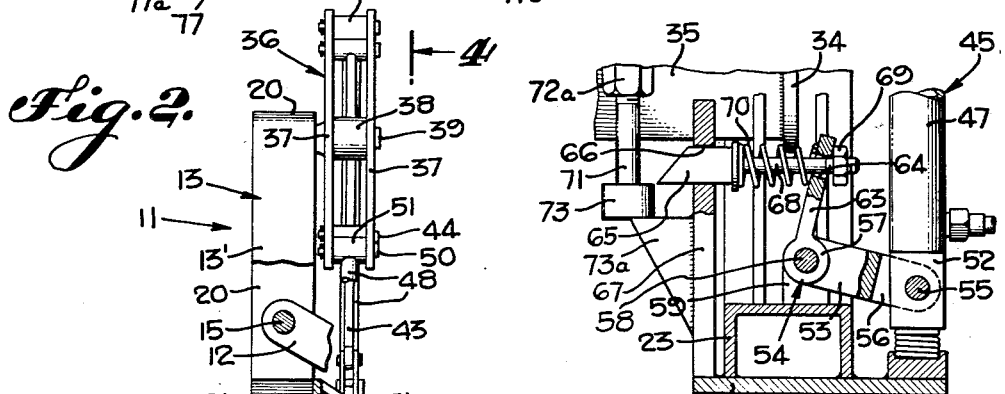
Fig. 2 is an enlarged partly sectioned elevational view of the attachment as shown in Fig. 1, only the shanks of the tools being shown in this view.

The main frame section 13' is provided with main bearing means consisting of rollers 29a, 29b and 29c disposed in a circle around an axis a—a of rotation for the tool support 16. The roller 29a is carried by a bifurcated bracket 30 supported by a gusset plate 31 which connects the upper ends of the diverging portions 21 of the main section 13' of the frame 13. The rollers 29b and 29c are supported by pedestals 32 secured to the bottom 23 of the frame so as to stand upwardly therefrom as shown in Figs. 2, 4 and 5.

The tool support 16 comprises a shaft 33 journaled in the outboard bearing 24 and a wheel member 34, comprising in effect a disc, the periphery of which engages the rollers 29a, 29b and 29c. The tool support 16 further includes plates 35, Figs. 2 and 5, which project rearwardly from the wheel member 34 and support the transverse tool bar 17 for rotation in a plane parallel to and adjacent the rear face of the main section 13'. A rocker member or arm 36 has an intermediate portion thereof connected to the upper end of the post section 20 for swinging movement. This rocker member 36 comprises spaced elongated plates 37 which are connected to a central bearing 38 arranged to rotate on a pin 39 which projects forwardly from the upper end of the post section 20. Adjacent the wheel member 34, the tool support 16 has thereon a sprocket 40. The sprocket 40 cooperates in forming a linkage between the rocker member 36 and the tool support whereby swinging of the rocker member 36 between first and second positions thereof will cause rotation of the tool support 16 between first and second positions thereof. This linkage is completed by a chain 41 which extends around the sprocket in such manner that its ends 42 project upwardly as best shown in Fig. 4, and means for connecting the ends 42 of the chain 41 with the rocker member 36 on opposite sides of the pivot means consisting of the pin 39. For this purpose links 43 are extended from the ends 42 of the chain to pins 44 which extend across the space between the plates 37 of the rocker member 36.

Figure 3:
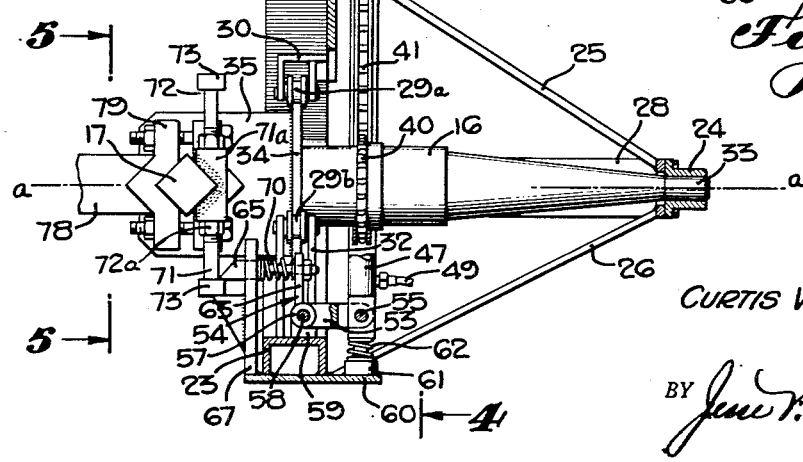
Fig. 3 is an enlarged fragmentary sectional view showing the manner of operation of the latch releasing means.

Fluid pressure differential operators 45 and 46 are provided for swinging the rocker member. Each of these operators 45 and 46 comprise a cylinder part 47 and a piston part 48. In the present practice of the invention, the fluid pressure differential consists of hydraulic fluid under pressure which is selectively introduced into the lower ends of the cylinders 47 through flexible conduits 49. The piston parts 48 are connected to the ends of the rocker member 36 by pins 50. As best shown in Fig. 2, the upper ends of the pistons 48 have transversely disposed sleeves 51 positioned between the ends of the plates 37 and turning on the pins 50. At the lower ends of the cylinder parts 47 there are flattened extensions 52 which are connected to the substantially horizontally extending portions 53 of bell crank levers 54, by pins 55. The portions 53 of the bell crank levers 54 have forks 56 to support the pins 55, and the flattened extensions 52 at the lower ends of the cylinder parts 47 engage the intermediate portions of the pins 55. The bell crank levers 54 have bosses 57 which are bored so that the bell crank levers 54 may turn on horizontally disposed pins 58, the ends of which pins 58 are supported by bosses 59 which project upwardly from the bottom member 23 of the frame main section 13'. Plates 60 extend forwardly from the lower portions of the bottom member 23 and support blocks 61 in spaced relation to the lower extremities of the cylinder part 47. Springs 62 are disposed between the blocks 61 and the lower extremities of the cylinder parts 47 to resiliently hold the cylinder parts in the raised positions in which they are shown in Figs. 1, 2 and 4. Each of the bell crank levers 54 has an upwardly extending arm 63, with an opening 64 near the upper end thereof, as best shown in Fig. 3. Latch members 65 are supported in openings 66 in guide plates 67, in such positions that stems 68 which project forwardly from the latch members 65 will extend through the openings 64 in the arms 63, there being nuts 69 threaded on the forward ends of the stems 68, as best shown in Fig. 3, so as to engage the rightward faces of the arms 63. Compression springs 70 are positioned around the stems 68 between the latch members 65 and the upper portions of the arm 63. Screws 71 and 72 are extended from the tool supporting bar 17, as shown in Fig. 2, so as to project respectively downwardly and upwardly, these screws 71 and 72 having near the ends thereof heads 73 providing shoulders for engagement by the latch members 65 when the tool support 16 is rotated into the extreme positions thereof. In Fig. 5, the tool bar 17 is shown in one of its positions. At this time the screw 71 projects downwardly so that its head will be engaged by the latch member 65 appearing on the right hand side of Fig. 5, and at this time the screw 72 extends upwardly. The remaining latch member 65 is disposed at the left hand side of the frame 13, in such position that when the tool bar 17 is rotated in counterclockwise direction to the opposite side of the frame 13 screw 72 will be extended downwardly across the left hand latch member 65 so that the left hand latch member 65 will engage the head 73 of the screw 72.

Right hand and left hand plows 76 and 77, as shown in Fig. 1, are connected to the tool bar 17. These plows 76 and 77 are shown as double bottoms. That is to say, there are two plow blades 76a and 76b and also two plow blades 77a and 77b. The blades 76a and 77a are carried by an arm 78 which is secured to the tool bar 17 by a clamp 79. The plow blades 76b and 77b are supported by an arm 80 which is connected to the tool bar 17 by a clamp 81, Figs. 4 and 5. The arms 78 and 80 are bifurcated as shown, and the arm 78 is longer than the arm 80 so that the plow blades 76a and 77a will be in trailing relation to, but offset from the plow blades 76b and 77b.

The operation of the tool attachment is as follows. Assuming that the blades 77a and 77b, disposed downwardly as shown, have reached the end of a furrow, the driver of the tractor actuates the power mechanism or tool lift of the tractor so as to swing the levers 10 upwardly, thereby carrying the tool attachment 11 and the plows into raised position. He will then operate a suitable valve to deliver hydraulic fluid under pressure through the conduit shown in Fig. 2 and depicted at the lefthand side of Fig. 4, into the lefthand cylinder part 47 of Fig. 4. The action of the hydraulic pressure within the lefthand cylinder part 47 will act to move the lefthand parts 47 and 48 relatively apart. Since the latch member 65 shown in Fig. 2 engages the head 73 of the screw 71, rotation of the tool support 16 will be thereby prevented and engagement of the chain 41 with the sprocket will prevent or limit clockwise rotation of the rocker member 36 shown in Fig. 4. The results of this will be that the lefthand cylinder part 47 of Fig. 4 will be moved downwardly, compressing the lefthand spring 62 and rotating the associated bell crank member 63, shown in Fig. 3, so as to move the associated latch member 65 into disengaged position relative to the head 73 of the screw 71. The release of the latch means 65 will then permit rotation of the tool support 16, and the lefthand cylinder part 48, Fig. 4, will move upwardly, swinging the rocker member 36 of Fig. 4 in clockwise direction. This swinging of the rocker arm or member 36 will be transmitted through the chain 41 and the sprocket 40 to the tool support 16 to rotate the same. The diameter of the sprocket 40 is so proportioned relatively to the spacing of the pins 44 which connect the upper ends of the links 43 to the rocker member 36 that an angular movement of approximately 75° by the rocker member 36 will result in a rotation of the tool support and its tool bar 17 through an angle of 180°. This will result in rotation of the plows 77a and 77b into raised position and rotation of the plows 76a and 76b into lowered position ready for engagement with the soil when the tool attachment is lowered. When the tool bar 17 is rotated in clockwise direction from the position in which it is shown in Fig. 4 into oppositely extending position, the head 73 of the screw 72 will ride across the latch 65 on the corresponding side of the frame 23, and this latch 65 will engage the head 73 of the screw 72 so as to hold the tool support 16 in its new position of operation. It will be understood that delivery thereafter of hydraulic fluid under pressure through the conduit 49 shown at the righthand side of Fig. 4 will result in the release of the associated latch and the swinging of the lever member 36 and the tool support back to their original positions, shown in full lines in the drawings.

An especial feature of the invention is the adjustable relation of the tool bar 17 and the frame 13 to compensate for the tilt of the tractor, to which the device is attached, as the result of one side wheel of the tractor running in a previously cut furrow while the other side wheel of the tractor runs on the unplowed ground at a higher elevation. The screws 71 and 72 are threaded into a block 71a which is welded onto the tool bar 17, so that they can be extended and retracted with relation to the tool bar 17, and thereby hold the tool bar 17 in angled relation to the member 23 of the frame 13 instead of parallel thereto as shown in the drawings for ease of illustration.

This adjustment is for the purpose of bringing the tool bar 17 into a position substantially level with respect to the surface of the ground when the transverse member 23 of the frame is tilted as the result of one side wheel of the tractor running in a furrow.

Referring to Fig. 5, the tool bar 17 is shown parallel to the transverse member 23, and both of these members 17 and 23 are shown horizontal. During the use of the equipment for plowing, for example, the frame 13 will be tilted in clockwise direction. That is to say, the rightward end of the member 23 will be lowered. To maintain the tool bar 17 substantially level, the screw 71 will be unscrewed and thereby further extended from the block 71a the required distance to bring the tool bar level, and then locked by the tightening of its lock nut 72a. The result of this is that when the head 73 of the screw 71 is in engagement with the stop 73a, as shown in Figs. 2 and 5, the position of the tool bar 17 with relation to the transverse member 23 will be determined by the length of the portion of the screw 71 which extends from the block 71a. A similar adjustment of the screw 72 is made for adjustment of the tool bar 17 when it is rotated to the opposite side of the frame 13. The degree of the adjustment of the tool bar 17 in the manner described in the foregoing depends in the existing conditions of operation. For example, in plowing it may depend upon the depth of cut or the size of the plow bottoms used.

I claim as my invention:

1. In a tool attachment for connection to a vehicle: a supporting frame including bearing means defining an axis of rotation extending longitudinally of the vehicle; a rotatable support turnable in said bearing means, said support having tool supporting means and means forming a pair of latch shoulders connected to said rotatable support; a rocker member having an intermediate portion connected to said frame; means connecting said rocker member and said support so that swinging of said rocker member will rotate said support between first and second positions; a pair of operating members each comprising a cylinder part and a piston part; means for connecting said operating members to said rocker member for operation thereof; means operative to apply fluid pressure differential to said operating members; latches supported by said frame for engagement with said latch shoulders so as to respectively hold said support in said first and second positions thereof; linkage means, adapted to act in response to pressure to release said latches; and means connecting said linkage means with said operating members and acting when fluid pressure differential is applied to said operating members to move said linkage means so as to release said latches.

2. In a tool attachment for connection to a vehicle: a supporting frame having an upright main section and extending bearing supporting means, said frame having bearing means defining an axis of rotation extending longitudinally of said vehicle; a rotatable support carried in said bearing means of said frame, said support having a transverse tool bar at the rearward end thereof, a pair of latch shoulders on said tool bar in positions offset from said axis of rotation; a rocker member; pivot means connecting an intermediate portion of said rocker member to the upper portion of said main section of said frame; a linkage connecting said rocker member to said support so that swinging of said rocker member between first and second positions thereof will rotate said support between first and second positions; a pair of operating members each comprising a cylinder part and a piston part; means for connecting one of the parts of each of said operating members to said rocker member on opposite sides of said pivot means; means for applying fluid pressure differential separately to said operating members; latches supported by said main section for engagement with said latch shoulders so as to respectively hold said support in said first and second positions thereof; spring means acting to hold said latches in positions for engagement with said latch shoulders; a pair of pressure operated latch releasing means respectively connected to said latches; and means connecting the other parts of said operating members to said latch releasing means so that when the parts of said respective operating members are moved by fluid pressure differential, pressure will be applied respectively to said latch releasing means to release said latches and said rocker member will be swung so as to move said support from one of its positions to the other depending upon which of said operating members is actuated by fluid pressure differential.

3. In a tool attachment for connection to a vehicle: a supporting frame having bearing means defining an axis of rotation extending longitudinally of said vehicle; a rotatable support carried in said bearing means of said frame, said support having a transverse tool bar at the rearward end thereof, a pair of latch shoulders in positions offset from said axis of rotation and a sprocket adjacent said main section; a rocker member; pivot means connecting an intermediate portion of said rocker member to the upper portion of said frame; a chain member running around said sprocket, the ends thereof being connected to said rocker members on opposite sides of said pivot means so that swinging of said rocker member will rotate said support between first and second positions; a pair of operating members each comprising a cylinder part and a piston part; means for connecting one of the parts of each of said operating members to said rocker member on opposite sides of said pivot means; means for applying fluid pressure differential separately to said operating members; latches supported by said frame for engagement with said latch shoulders so as to respectively hold said support in said first and second positions thereof; bell crank levers pivotally mounted on said frame and being respectively connected to said latches so as to, when moved, release the latches; spring means acting to hold said latches in positions for engagement with said latch shoulders; and means connecting the other parts of said operating members to said bell crank levers so that when said parts of said operating members are respectively moved by said fluid pressure differential, said levers will be moved against the action of said spring means to release said latches and said rocker member will be swung so as to move said support from one of its positions to the other.

4. In a tool attachment for connection to a vehicle: a supporting frame having bearing means defining an axis of rotation extending longitudinally of said vehicle; a rotatable support carried in said bearing means of said frame, said support having a transverse tool bar at the rearward end thereof, a pair of latch shoulders in positions offset from said axis of rotation and a sprocket adjacent said main section; a rocket member; pivot means connecting an intermediate portion of said rocker member to the upper portion of said frame; a chain member running around said sprocket, the ends thereof being connected to said rocker member on opposite sides of said pivot means so that swinging of said rocker member will rotate said support between first and second positions; a pair of operating members each comprising a cylinder part and a piston part; means for connecting one of the parts of each of said operating members to said rocker member on opposite sides of said pivot means; means for applying fluid pressure differential separately to said operating members; latches supported by said frame for engagement with said latch shoulders so as to respectively hold said support in said first and second positions thereof; spring means acting to hold said latches in positions for engagement with said latch shoulders; a pair of pressure operated latch releasing means respectively connected to said latches; and means connecting the other parts of said operating members to said latch releasing means so that when the parts of said respective operating members are moved by fluid pressure differential, pressure will be applied respectively to said latch releasing means to release said latches and said rocker member will be swung so as to move said support from one of its positions to the other depending upon which of said operating members is actuated by fluid pressure differential.

5. In a tool attachment for connection to a vehicle: a supporting frame having bearing means defining an axis of rotation extending longitudinally of said vehicle; a rotatable support carried in said bearing means of said frame, said support having a transverse tool bar at the rearward end thereof, a pair of latch shoulders in positions offset from said axis of rotation; a rocker member; pivot means connecting an intermediate portion of said rocker member to the upper portion of said frame; a linkage connecting said rocker member to said support so that swinging of said rocker member between first and second positions thereof will rotate said support between first and second positions thereof; a pair of operating members each comprising a cylinder part and a piston part; means for connecting one of the parts of each of said operating members to said rocker member on opposite sides of said pivot means; means for applying fluid pressure differential separately to said operating members; latches supported by said frame for engagement with said latch shoulders so as to respectively hold said support in said first and second positions thereof; spring means acting to hold said latches in positions for engagement with said latch shoulders; a pair of pressure operated latch releasing means respectively connected to said latches; and means connecting the other parts of said operating members to said latch releasing means so that when the parts of said respective operating members are moved by fluid pressure differential, pressure will be applied respectively to said latch releasing means to release said latches and said rocker member will be swung so as to move said support from one of its positions to the other depending upon which of said operating members is actuated by fluid pressure differential.

6. A tool attachment as defined in claim 1 wherein said means connecting said rocker member to said support comprises connections extending from the ends of said rocker member, said connections having flexible portions which curve under said rotatable support and have engagement therewith whereby movement of said rocker arm will be carried through said connections to said rotatable support to rotate the same.

7. In a tool attachment for connection to a vehicle: a supporting frame having an upright main section and extending bearing supporting means, said frame having bearing means defining an axis of rotation extending longitudinally of said vehicle; a rotatable support carried in said bearing means of said frame, said support having a member extending outwardly therefrom, a pair of latch shoulders on said member in positions offset from said axis of rotation; a rocker member; pivot means connecting an intermediate portion of said rocker member to the upper portion of said main section of said frame; a linkage connecting said rocker member to said support so that swinging of said rocker member between first and second positions thereof will rotate said support between first and second positions thereof; a pair of operating members having parts movable by fluid pressure differential; means for connecting one of the parts of each of said operating members to said rocker member on opposite sides of said pivot means; means for applying fluid pressure differential separately to said operating members; latches supported by said main section for engagement with said latch shoulders so as to respectively hold said support in said first and second positions thereof; spring means acting to hold said latches in positions for engagement with said latch shoulders; a pair of pressure operated latch releasing means respectively connected to said latches; and means connecting movable parts of said operating members to said latch releasing means so that when the parts of said respective operating members are moved by fluid pressure differential, pressure will be applied respectively to said latch releasing means to release said latches and said rocker member will be swung so as to move said support from one of its positions to the other depending upon which of said operating members is actuated by fluid pressure differential.

8. In a tool attachment for connection to a vehicle: a supporting frame including bearing means defining an axis of rotation extending longitudinally of the vehicle; a rotatable support turnable in said bearing means, said support having tool supporting means; a rocker member having an intermediate portion connected to said frame; means connecting said rocker member and said support so that swinging of said rocker member will rotate said support between first and second positions; a pair of operating members having parts movable by fluid pressure differential; means for connecting said operating members to said rocker member for operation thereof; means operative to apply fluid pressure differential to said operating members; latch means operative between said frame and said rotatable support to respectively hold said support in said first and second positions thereof; and releasing means for said latch means connected to movable parts of said operating members so as to be thereby actuated when fluid pressure differential is applied respectively to said operating members.

9. In a tool attachment for connection to a vehicle: a supporting frame including bearing means defining an axis of rotation extending longitudinally of the vehicle; a rotatable support turnable in said bearing means, said support having tool supporting means; a rocker member having an intermediate portion connected to said frame; means connecting said rocker member and said support so that swinging of said rocker member will rotate said support between first and second positions; fluid operated means for swinging said rocker arm back and forth, said fluid operated means comprising relatively movable parts to which fluid pressure imparts movement and which are respectively connected to said frame and said rocker member so as to effect said swinging thereof; means operative to apply fluid pressure differential to said fluid operated means; latch means operative between said frame and said rotatable support to respectively hold said support in said first and second positions thereof; and releasing means for said latch means, said releasing means being connected to a relatively movable part of said fluid operated means so as to be thereby actuated and caused to release said latch means when fluid pressure is applied to said fluid operated means.

References Cited in the file of this patent

UNITED STATES PATENTS

| 1,166,169 | Bahmuller | Dec. 28, 1915 |
| 2,079,595 | Collins | May 11, 1937 |
| 2,153,824 | Collins | Apr. 11, 1939 |
| 2,303,320 | Benjamin | Dec. 1, 1942 |

FOREIGN PATENTS

| 746,736 | France | Mar. 14, 1933 |
| 7,089 | Great Britain | of 1895 |